(12) United States Patent
Otto et al.

(10) Patent No.: US 11,662,456 B2
(45) Date of Patent: May 30, 2023

(54) METHOD TO DETERMINE A PRESENT POSITION OF AN OBJECT, POSITIONING SYSTEM, TRACKER AND COMPUTER PROGRAM

(71) Applicant: Fraunhofer-Gesellschaft e.V., Munich (DE)

(72) Inventors: Stephan Otto, Heroldsberg (DE); Tobias Feigl, Gerhardshofen (DE); Christian Daxer, Happurg (DE); Alexander Bruckmann, Nuremberg (DE); Christoffer Loeffler, Nuremberg (DE); Christopher Mutschler, Cadolzburg (DE); Marc Faßbinder, Nuremberg (DE)

(73) Assignee: Fraunhofer-Gesellschaft zur Förderung der ange-wandten Forschung e. V., Munich (DE)

(*) Notice: Subject to any disclaimer, the term of this patent is extended or adjusted under 35 U.S.C. 154(b) by 212 days.

(21) Appl. No.: 16/771,258

(22) PCT Filed: Dec. 11, 2017

(86) PCT No.: PCT/EP2017/082265
§ 371 (c)(1),
(2) Date: Jun. 10, 2020

(87) PCT Pub. No.: WO2019/114925
PCT Pub. Date: Jun. 20, 2019

(65) Prior Publication Data
US 2020/0371226 A1    Nov. 26, 2020

(51) Int. Cl.
*G01S 13/86* (2006.01)
*G01S 1/70* (2006.01)
*G06F 3/01* (2006.01)

(52) U.S. Cl.
CPC .......... *G01S 13/867* (2013.01); *G01S 1/7032* (2019.08); *G06F 3/012* (2013.01)

(58) Field of Classification Search
None
See application file for complete search history.

(56) References Cited

U.S. PATENT DOCUMENTS 5,592,401 A    1/1997    Kramer
5,831,260 A *  11/1998   Hansen ................ A61B 5/1114
                                                         250/221

(Continued)

FOREIGN PATENT DOCUMENTS

JP    2004-157397 A    6/2004
JP    2006-3157 A      1/2006

(Continued)

OTHER PUBLICATIONS

Welch G. et al: "Motion tracking: no silver bullet, but a respectable arsenal", IEEE Computer Graphics and Applications, IEEE Service Center, New York, NY, US, vol. 20, No. 6, Nov. 1, 2002, pp. 24-38, XP011201226, ISSN: 0272-1716.

*Primary Examiner* — Talha M Nawaz
(74) *Attorney, Agent, or Firm* — 2SPL Patentanwälte PartG mbB; Kieran O'Leary (57) ABSTRACT

A method (100) to determine a present position (122) of an object (600). The method (100) comprises using (102) an optical positioning system (104) to determine a first preliminary position (112) and using (106) a radio-based positioning system (108) to determine a second preliminary position (114), determining (110) a supposed position (116) on the basis of one of the preliminary positions (112, 114) and combining (108) the supposed position (116) with a previous position (212) of the object to determine the present position (122) of the object, if the supposed position (116) is based on a different positioning system (104, 108)

(Continued)

than a previous supposed position (116'). A positioning system (500) with combined optical and a radio-based determination of a position of a tracker (600) and a tracker (600) with an active light source (608).

18 Claims, 6 Drawing Sheets

(56) References Cited

U.S. PATENT DOCUMENTS

| | | | |
|---|---|---|---|
| 2010/0019487 A1 | 1/2010 | deCler et al. | |
| 2010/0194879 A1* | 8/2010 | Pasveer | A61B 5/1127 |
| | | | 348/135 |
| 2014/0155104 A1* | 6/2014 | Jarvis | G01C 21/206 |
| | | | 382/103 |
| 2015/0010600 A1 | 1/2015 | Clare et al. | |
| 2015/0106004 A1* | 4/2015 | Taylor | G01S 15/46 |
| | | | 701/300 |
| 2015/0136947 A1* | 5/2015 | Barak | G01S 5/163 |
| | | | 250/206.1 |
| 2022/0075090 A1* | 3/2022 | Edwards | G01R 33/3808 |

FOREIGN PATENT DOCUMENTS

| | | |
|---|---|---|
| JP | 2006-520905 | 9/2006 |
| JP | 2008-197733 A | 8/2008 |
| JP | 2009-204429 A | 9/2009 |
| WO | 2009113265 A1 | 9/2009 |
| WO | 2016171387 A1 | 10/2016 |

* cited by examiner

METHOD TO DETERMINE A PRESENT POSITION OF AN OBJECT, POSITIONING SYSTEM, TRACKER AND COMPUTER PROGRAM

FIELD

Examples relate to a method for determining a present position of an object by using a positioning system. Other examples relate to a positioning system with means for optical and radio-based determination of a position of an object, a tracker for a positioning system with means for optical and radio-based determination of a position and a computer program.

BACKGROUND

A positioning system may comprise means for optical determination of a position of an object or means for radio-based determination of the position of the object.

A system for optical determination may comprise a target or optical marker for the tracking by e.g. a camera, the target can e.g. comprise a combination of optical markers. Using an optical system may have the effect that a determination of a position may fail temporary due to an interruption of a visual contact or a line of sight between the target (multiple markers) or a single marker and the camera. However, if a visual contact is available, an accurate determination of the position (single marker based) as well as an orientation of the target (multiple markers) may be achieved.

Other systems for radio-based determination may comprise a radio transceiver as a tracker. By sending and receiving radio signals between the tracker and stationary components of the system the position can be determined. Using a radio-based system may have the effect that a determination of a position is less accurate than by determining a position using an optical system.

For an optical system, a determination of a position may not be possible if a visual contact to a marker is interrupted. A radio-based determination system may not achieve an accuracy of the determined position which is high enough for some applications. Furthermore, a determination of an orientation with sufficient reliability may not be possible using the radio-based positioning system.

There may be a desire to improve a method to determine a position by using a positioning system and to improve a positioning system with means for determining a position of an object.

SUMMARY

An embodiment relates to a method to determine a present position of an object or a present position of a tracker, the tracker being positioned at the object, respectively. According to the method an optical positioning system is used to determine a first preliminary position, which is a position of an optical marker (that may be active or passive), the marker being positioned at the object. A radio-based positioning system is used to determine a second preliminary position, being a position of a radio transmitter or transceiver at the object. A supposed position is determined on the basis of one of the preliminary positions. The determined supposed position is combined with a previous position of the object to determine the present position of the object, if the supposed position is based on a different positioning system than a previous supposed position.

One aspect can be that the method is run several times or several performances of the method are carried out in order to determine a change of the present position of the object. In other words, the method can be used for tracking the object. After at least two times determining the present position there is a previous supposed position available, that was determined on the basis of one of the two positioning systems, i.e. either the first or the second preliminary position. In the second performance of the method the supposed position can be e.g. based on the optical positioning system. In this example, the supposed position and the previous position (e.g. the present position of the first performance of the method) are combined if the supposed position of the first performance of the method, i.e. the previous supposed position, is based on the radio-based positioning system.

According to the method both an optical and a radio-based positioning system are used for the determination of a position so that a present position of an object can be determined. For tracking of the object, i.e. tracking a present position of the object, the present position can e.g. be determined continuously or quasi-continuously (e.g. with a rate of 5 Hz, 20 Hz, 25 Hz or 50 Hz or about 20 Hz, comparable to a quasi-continuous image stream in a video). The present position of the object can be based on a position of a tracker and/or marker at the object, i.e. the optical marker and/or the transmitter, and e.g. knowledge about the position of the tracker at the object. It can also be possible to equate the position of the tracker with the position of the object comprising the tracker.

A tracker may comprise one single optical marker or multiple optical markers arranged in a specific pattern. An active optical marker may comprise an LED (light emitting diode). An optical marker according to the application can be a single optical marker (active or passive) or a target (active or passive) comprising a plurality of active or passive single optical markers.

Each of the positioning systems therefore can determine a position which is called preliminary position, i.e. a preliminary position corresponds to a respective positioning system. Based on one of the preliminary positions a supposed position is determined. In a standard situation or steady state this supposed position can be used as the determined present position. Additionally, for the determination of the supposed position a systematic error may be considered and compensated in such a steady state. A state can in some examples be called steady state if the supposed position is based on a same positioning system as a previous supposed position.

Using two different positioning systems can have the effect that if one of the positioning systems shows a malfunction or fails, e.g. temporary, the present position still can be determined by the other positioning system so a redundancy can be provided. A further effect can be that the optically determined position can have a better accuracy so that the optical positioning system can e.g. be used until it temporary cannot determine a preliminary position due to e.g. an interruption of a visual contact between the optical marker and a camera of the optical positioning system. For example, as long as the supposed position cannot be based on the first preliminary position it can be based on the second preliminary position.

A radio-based positioning system may cover a greater area or range in which it can determine a position than an optical positioning system. It therefore might be necessary to provide more cameras than radio transceivers to determine the position of the tracker in some cases. According to the method it can be avoided to increase a number of cameras compared to radio receivers because an active optical tracker can be used for the optically-based position determination, i.e. an optical positioning system a system with at least one active optical marker is used in which a camera can receive the optical signal from the active optical marker if a visual contact exists. Thus, a number of cameras can be reduced for a predefined area e.g. compared to a system using passive optical markers. Using an active optical marker can have the effect that a camera can determine an active light signal of the optical marker also in a greater distance compared to a passive marker so that e.g. a coverage area of the optical and radio based positioning system can be equal or of a similar scale. Thus, a camera and a transceiver of the respective positioning system can be provided together at a same spot or in a common package within or next to an area of coverage of the positioning system so that additional single cameras can be avoided in some cases. Using an active optical tracker thus can improve the combination of an optical and a radio-based system to determine the supposed position according to the method.

An active tracker with light modulation and/or pulsing active targets may have the effect to enable identification in the cases of surrounding noise (sunlight); enable identification with different codes for each target; enable synchronization of the cameras. Blinking and pulsing light can be modulated in a way to detect hidden/occluded (e.g. occluded by noise of sunlight that makes a constant light emitter undetectable, etc.) trackers. Blinking and pulsing light can be asked by a server based on the present position of the tracker that is determined by radio based system and that is still visible and through the blinking can be tried to be identified by the cameras again. A predefined modulation pattern can be adapted to a situation or determined and known by the positioning system such that it can detect the active marker also in the case that a light density is low, e.g. by using correlation.

It was already mentioned that the supposed position can be based on the first preliminary position as long as the optical system can determine a position, e.g. as long as a visual contact to the optical marker is not interrupted. In contrast, if the object is e.g. covered by an object the supposed position can be determined based on the radio-based positioning system. In this case the supposed position is determined based on a different positioning system than a previous supposed position because here it is based on the radio-based positioning system whereas before it was based, i.e. the previous supposed position is based on the optical positioning system.

In such situation, if the supposed position is based on a different positioning system than a previous supposed position, according to a step of the method the supposed position is combined with the previous position of the object for determining the present position. Combining means that now the supposed position based on the second preliminary position is not used as the present position, i.e. the steady state is left, but depending on the supposed position and the previous position. Combining can have the effect that the determined present position does not alter or jump suddenly to a different position due to a change of the positioning system the supposed position is based upon which may determine a different preliminary position than the other positioning system. It can e.g. be possible that the object does not move when the positioning system changes whereas due to e.g. a difference in accuracy between the positioning systems the first and the second preliminary positions can differ and in consequence the now determined supposed position can differ from the previous position although the object did not move at all. In this example, the combining can e.g. result in determining the present position to be equal to the previous position. Avoiding changes or sudden changes in the determined present position due to a change of the positioning system if the object does not move or does not change its position can improve the positioning system. Two different position determination systems, i.e. optical and radio-based system, can be used while avoiding sudden changes or jerks of the present position when switching between the different positioning systems. In contrast, the present position is adapted or aligned to the respective other positioning system gradually by the combining step. In other words, a function that describes the change of the present position is smooth also if the different positioning system is used for determining the present position.

In one example, the method can be used in a virtual reality system and the object is a user moving in a virtual reality. By providing the method a sudden change of the position presented to the user, e.g. visualized on a screen, can be avoided in e.g. a situation where the user does not move but the used positioning system changes. For example, a radio-based position differs from an optical based position and the radio-based system is now the basis of the position determination, i.e. the basis of the supposed position, instead of the optical system which had been the basis before. In this example jerks in the visualization can be avoided and a user experience can be improved by using the method.

The combining of the supposed position and the previous position can depend on different parameters, e.g. an alteration of the supposed position compared to a previous supposed position of the same positioning system. This means the combining is different e.g. if there is no change between a supposed position and a previous supposed position of the same positioning system compared to a situation where such change occurs. This can have the already described effect in e.g. a virtual reality of avoiding jerks or visualized movement if the user does not move at all.

If by contrast a change of the supposed position compared to a previous supposed position occurs, e.g. the supposed position alters into the direction of the previous position, the present position may be determined to not change as much with respect to a previous present position as the supposed position alters with respect to a previous supposed position. If in contrast the supposed position changes to an opposite direction, i.e. away from the previous position, the present position can be determined to show a greater change with respect to a previous present position than the change of the supposed position with respect to its previous supposed position. In both cases, the effect is that after the combining a distance between the present position and the previous position is smaller, thus a difference of the first and second preliminary position due to e.g. a different accuracy of the positioning systems can be compensated gradually according to the method. After a certain number of iterations of the method the compensation can be completed so that again the positioning system can be operated in a steady state, now based on the respective other positioning system. The smooth or gradual compensation may result in avoiding jerks or sudden changes of the determined present position with respect to the previous position while at the same time leading the present position to an actual position of the object during a transition state. The effect may be used e.g. in a virtual or augmented reality context as jerks may lead to displeasure or sickness of a user due to optical impressions which differ from sensitive or motoric impressions (the picture of a scene which is shown from a perspective based on the determined present position would jump to another perspective without that a user has to move which could have negative effects of a user experience). The method can be used for improved tracking of objects both with a high accuracy and an increased reliability due to the redundant optical and radio-based positioning systems and the described controlled changing from one to the respective other positioning system.

According to one embodiment of the method an available preliminary position is used as the supposed position if either the first or the second preliminary position is not available. In certain situations, one of the positioning systems may not be able to determine a respective preliminary position. For the optical system this may be the case if e.g. a third object is positioned between the optical tracker and the camera such that it interrupts a respective visual contact. For the radio-based system this may be the case if e.g. interference radiation, e.g. due to multipath wave propagation, disturbs a radio signal of the radio-based positioning system such that a radio-based determination may be impossible temporary or lead to dilution of precession. The embodiment can have the effect that if one of the positioning systems fails, the present position of the object can still be determined. Although the two systems may determine different preliminary positions, according to the method the present position does not change suddenly in the case of using the other positioning system as it is adjusted to the respective other position gradually by combining the supposed position with the previous position. The real position or determined present position is moving relatively along/with the current active positioning system as long as there is an offset to the ground truth optical system.

According to one embodiment of the method the first preliminary position is used as the supposed position if both the first and the second preliminary positions are available. The optical positioning system may be more accurate in determining the position of the object so that according to this embodiment the determination can be more accurate. The optical system may be described as a principal determination part whereas the radio-based system is an auxiliary determination part that can be used if the optical system is temporary not able to determine a position or to identify the correct optical position. This can have the effect that in general a determined position is very accurate because of the accuracy of the optical system whereas a position can still be determined if the optical systems fails temporary, e.g. because of an interruption of the visual contact of the camera to the optical marker. In some examples, it is thus possible that the previous supposed position is based on the radio-based positioning system while the optical positioning system is available or available again after a temporary failure such that the supposed position is based on the optical system. In these examples, the combining can take place until the present position is smoothly adapted to the optical system and a steady state is achieved.

According to another embodiment of the method combining the supposed and the previous position comprises determining the present position of the object by reducing an initial offset between the previous position and the supposed position. The initial offset is the distance between the previous position and the supposed position which is the first determined supposed position based on the different positioning system. As an example, the present position of a tracked object may be based on the optical system until the optical system fails. The present position of the last performance of the method in which it is based on the optical system is called the previous position. In the next performance of the method, i.e. the first performance in which the supposed position is based on the radio-based system, the initial offset is determined to be the distance between this supposed position (first supposed position which is radio-based) and the previous position (last present position which is based on the optical system).

This initial offset can be a vector, e.g. with three orthogonal components, and can be added to the second preliminary position. This has the effect that the determined present position of the object remains the same also if a change of the positioning system occurs. To compensate the difference, i.e. the offset, the initial offset can be reduced gradually, i.e. jerks or sudden changes of the determined present position can be avoided. Reducing the offset can be implemented in different ways. The following techniques can be implemented independently or in combination and can be adapted e.g. if the method is used in a virtual reality environment to a user setting according to user preferences. It is e.g. possible to adjust a speed of reducing the initial offset, wherein faster reducing the offset means reducing it within less performances of the method so that an adaptation to the respective other positioning system is carried out faster.

According to one embodiment of the method the offset is reduced if the supposed position is changed with respect to a previous supposed position. The previous supposed position which is meant here is based on the same positioning system as the supposed position. This means, that the offset is only reduced in the case that the respective positioning system determines a change of the position of the tracker. It can already be reduced within the first performance in which the supposed position is based on a different positioning system than the previous position or previous supposed position because the previous supposed position of the same positioning system can also be available (though it had not been used before) if the previous position was based on the other positioning system. This has the effect that already in the first combining step the offset can be reduced so that the transition or adaption from one to the other positioning system can be carried out faster or within less determination steps of a respective present position. Thus, e.g. if the supposed position is based on the optical positioning system, a more accurate position can be provided faster while avoiding jerks or sudden changes between the determined and the previous present position.

In one embodiment of the method, reducing an offset takes place only if the supposed position is changed towards the previous position. This means that if e.g. the previous position is in a positive x-direction from the supposed position, the offset is only reduced if the supposed position moves into positive x-direction. If by contrast it moves in a y-direction and/or a z-direction but not in the x-direction, the offset or at least the x-direction part of the offset is not reduced (or only by an unnoticeable fraction/amount as users can be cheated/manipulated with respect to to unknowingly accept translational (x/y) gains to a certain amount; they also accept x/y gains if only one direction is real). This avoids e.g. in tracking in a virtual reality context unnatural changes of a perspective shown to a user. A user could have a negative experience if her point of view in the virtual reality would change into y-direction although she does only move into x-direction physically whereas a user may not notice whether an absolute change of the virtual position is exactly equal to a physical change in the same direction such that the offset can be reduced into the direction of the user in which she moves without the user to notice it or to have a bad experience from it. It can e.g. be possible that a y-direction offset can be reduced if a user only moves into x-direction while at the same time changing her orientation.

According to one embodiment of the method, reducing the offset further comprises reducing the offset by a predetermined fraction of the initial offset. The fraction can be subtracted in a number of determination steps in which a respective present position is determined, until the offset is fully compensated. In other words, the compensation of the difference between the two preliminary positions determined by the two positioning systems at the time when a change of the positioning system as the basis of the supposed position occurs can be carried out in a number of steps (subsequent iterations of the method) until a steady state is reached again. A smoothing of the adaptation to the other positioning system can be improved by increasing the number of steps thus by decreasing the fraction. The fraction can additionally or alternatively be subtracted until the supposed position is based on a different positioning system than a previous supposed position. In other words, if the transitional state is not completed before the respective other, especially the optical, positioning system is available again a full reduction of the initial offset may not be carried out. In this case, a new initial offset can be determined and the new initial offset can be reduced to get back into the steady state of the original positioning system. The predefined fraction may depend on an absolute value of the offset or the initial offset, i.e. the distance between the previous position and the supposed position which is the first supposed position based on the different positioning system. E.g. the fraction can be 1% or 5% or 20% of the initial offset. The fraction can be smaller in percentage if the absolute value of the initial offset is larger, thus large absolute changes of the present position can be avoided. The fraction can also be 1% or 5% or 20% of the remaining offset such that a non-linear compensation and thus an especially smooth approach to the new positioning system can be achieved. Typically the fractions can be only as large as the users do not notice it; the fraction as are individual to the users. Thus, a fraction can be adjusted according to an acceptance of an user individually.

In one embodiment of the method reducing the offset depends on a position change of the object and comprises reducing the offset by up to 20% of a position change between the supposed position and the previous supposed position. It is also possible to reduce the object by 10% or 5% of the position change depending for example on the absolute value of the offset. In other words, the offset is reduced by a value which depends on the movement of the object. If the position change is big, the reduction can be larger whereas if the position change is small, the reduction is small too. This can have the effect that e.g. in a virtual reality a perspective of a user does not change strongly if the user only moves slightly. Hence, with this embodiment it can be achieved that a user does not notice the reduction of the offset because it is adapted to a movement of the user. To avoid a divergence a remaining offset can be reduced completely when a predefined lower limit is reached, i.e. a remaining offset of 1 cm or 1 mm depending on an application. A relative offset does not matter as long as there is no collision of users possible.

The proposed system in one example also keeps track of all users and secures the amount of relative thresholds in a way that users cannot collide. I.e. if there is a risk of collision between two users with respective trackers, an offset can e.g. be reduced immediately or at one step.

In other embodiments the method further comprises determining an orientation of the object, by using an optical positioning system. It can be the same optical positioning system as for determining the position or an additional positioning system. The object can be positioned within an area covered by the positioning system with a certain orientation. This orientation can be described by a value of an angle to a fixed stationary position of the optical positioning system, e.g. a stationary marker in or at the covered area. The orientation angle can be determined by determining the orientation of the optical marker or active optical marker to the stationary marker in three orthogonal directions. This means an orientation angle can comprise a yaw and/or a pitch and/or a roll component.

In some embodiments due to an interruption of a visual contact to the stationary marker it may be temporary not possible to determine a present orientation of the object optically. In such situations the orientation angle can be determined e.g. by initial sensors such as acceleration sensors provided at the object or the tracker. For example the tracker can comprise a gyroscope. When the visual contact is available again, the new optically determined orientation or orientation angle can be described as a reference orientation. In these embodiments an initial offset between the orientation that is based on the initial sensors, and the reference orientation is reduced, if the reference orientation is determined using a reference system, e.g. the optical system with the stationary marker. This has the effect that a change of the orientation system can take place without jerks or sudden changes of the determined present orientation although the two orientation systems may determine different orientation angles due to e.g. different accuracies. The reduction of the offset of the orientation angle can be carried out in same ways the reduction of the offset of the position can be carried out as described above.

One example relates to a method that uses a gyroscope for determining an orientation in the case that a determination of an orientation by an optical system is temporary not possible, e.g. due to an interruption of a visual contact. E.g., an offset to the reference system may be reduced if an orientation determined by the gyroscope differs from the reference orientation.

In some embodiments of the method reducing a residual offset completely in one single step is provided if a predefined condition is fulfilled. This means that a remaining offset which can be e.g. 10% of the initial offset or 50% or 90% of the initial offset can be reduced in a single combination of the supposed position and the previous position in certain situation. The predefined condition can be fulfilled e.g. in a virtual reality environment if a specific content is shown to a user. The specific content can comprise situations in which an exact position and/or orientation is not within a scope of perception of the user, e.g. if darkness and/or other obscuring effects (e.g. fog, smog or a high concentration of other particles in the air) are shown and/or a virtual door is opened and/or closed and or the user can see only one part of one object because she is very close to this object. Other specific content can comprise earthquakes in the virtual reality or artificial transformation of the environment like intentional stretching or compressing of a virtual scene and/or objects of the virtual scene.

According to some embodiments an active light source at the object is used as an optical marker. The light source can be set with respect to its light emitting intensity, e.g. the intensity can be increased, so that a range of coverage of an area of the positioning system, i.e. an area in which the optical marker can be sensed by a camera of the system can be increased. As described before, this can have synergetic effects concerning the needed number of stationary components or tracking components of the positioning system. E.g. a number of cameras for the optical system can be adapted to a number of transceivers which are needed in the radio-based system. Therefore, a complexity of a positioning system could be reduced by using the method as well as costs of the positioning systems due to fewer cameras needed to carry out the method.

According to other embodiments of the method the active light source comprises at least one infrared light. This can have the effect that the light source is not visible or perceptible for humans and thus does not disturb e.g. in augmented reality applications in which a user can see the optical marker as well as virtual objects of the augmented reality.

Using a larger number of optical markers, e.g. two, three or four markers, e.g. redundancy markers, can have the effect to easier determine an orientation (e.g. if one of the markers is an infrared light source while another marker is another light source) or to increase a reliability of the optical system. For example, the chances are higher that at least one of the markers is not covered from a camera perspective, such that at least one visual contact is available for determining the position. Thus, the tracker of the optical positioning system can comprise a plurality of active optical markers.

Another aspect relates to a positioning system with combined optical and a radio-based determination of a position of a tracker. The positioning system comprises at least one tracker comprising at least one optical marker and at least one radio-based tracker for optical and radio-based position determination respectively. It comprises at least one tracking device with means to receive an optically determined and a radio-based determined position of the tracker as possible supposed positions of the tracker, wherein the tracking device is configured to determine a present position of the tracker based on a combination of the supposed position with a previous position of the tracker. The system is thus a system with means to carry out the before described method. An aspect of the positioning system relates to a positioning server that is configured to combine signals comprising position information of an optical and a radio-based positioning system. The positioning server is configured to enable a determination of a present position that can be determined by a combining if a change from the optical to the radio-based position determination and/or from the radio-based position to the optical position determination occurs. The positioning server thus enables a smooth switching between the optical and radio-based system, i.e. without sudden jumps in the determined present position when e.g. tracking an object.

Other aspects relate to a tracker for a combined optical and radio-based positioning system. The tracker comprises an optical marker, comprising an active light source and a radio transmitter, configured to send an information signal comprising a position of the tracker. A positioning system thus can determine the position of the tracker both optically and radio-based such that the above described effects can be achieved and e.g. a number of cameras can be reduced.

One embodiment relates to a tracker for a combined optical and radio-based positioning system, wherein the active light source comprises an infrared light which emits a constant light signal or a pulsed light signal. The tracker can e.g. avoid disturbance of users, e.g. in augmented reality applications because the active infrared light signal is not perceptible by human eyes.

For the use in virtual reality or augmented reality applications, according to other embodiments the tracker is configured to be wearable on a head of a user or attachable to a helmet and/or the tracker is a virtual-reality-wearable and/or augmented-reality-wearable. In other words, the tracker might be a helmet or comprised in glasses or a headband. The tracker might also be attachable to a helmet. This can increase the reliability of the optical determination system as a position at a head of user can reduce the risk of an interruption of a visual contact to a camera of the system, e.g. if the camera is positioned in an upper position, e.g. at a wall or a ceiling. Though, in other examples it is possible that the tracker is integrated in other wearables such as a jacket or a belt.

Further aspects relate to a computer program including program code. When executed, the program code causes a programmable processor to perform one of the previously described methods.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
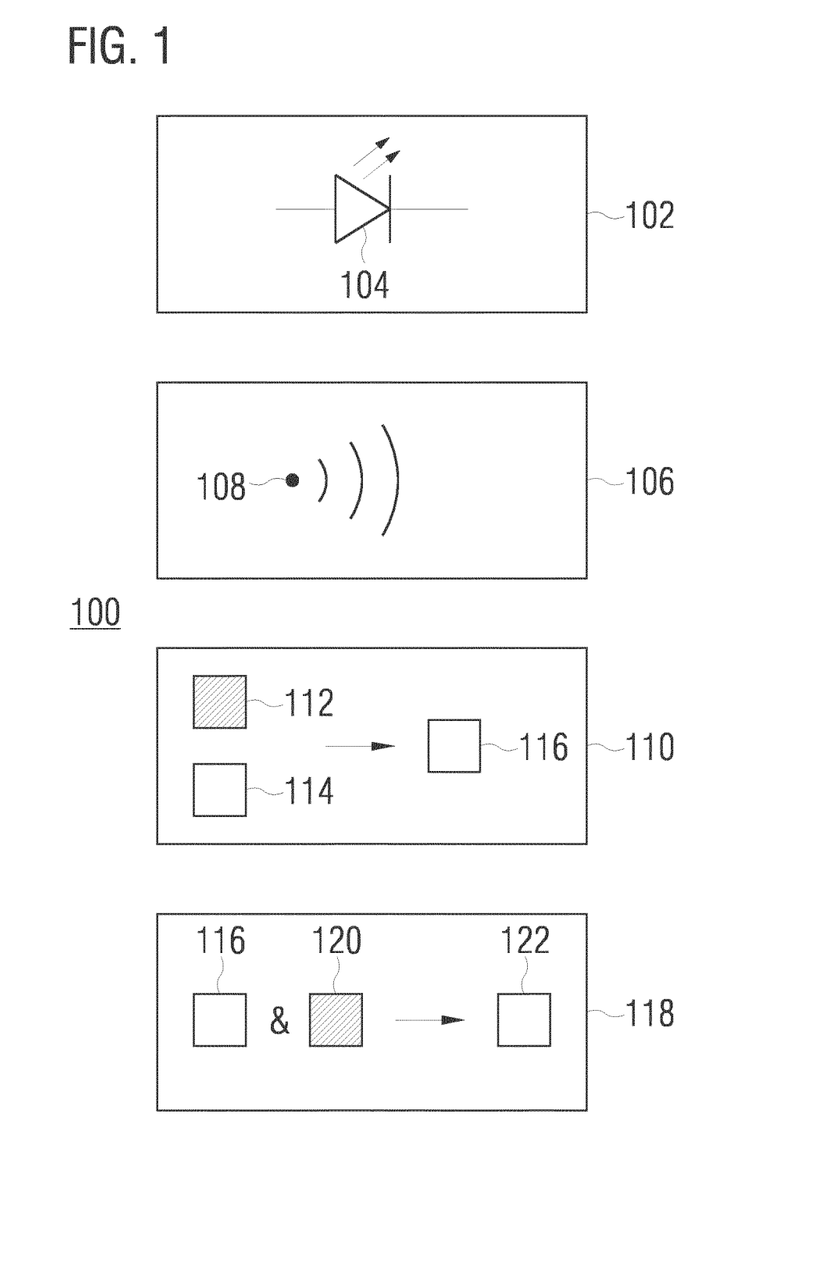
FIG. 1 shows an example of a method.

FIG. 1 shows an example of a method 100 to determine a present position 122 of an object. The method 100 comprises using 102 an optical positioning system 104 to determine a first preliminary position 112 which is a position of an optical marker at the object. It further comprises using 106 a radio-based positioning system 108 to determine a second preliminary position 114 which is a position of a transmitter at the object. The method 100 comprises determining 110 a supposed position 116 on the basis of one of the preliminary positions 112, 114 and combining 118 the supposed position 116 with a previous position 120 of the object to determine the present position 122 of the object, if the supposed position is based on a different positioning system than a previous supposed position.

In an example the supposed position 116 is based on the radio-based positioning system 108, i.e. it is determined on the basis of the second preliminary position 114. The previous position 120 is a previously determined position of the object, i.e. a present position of the object in at least one determination step, i.e. performing the method, before the present performance of the method. The previous position in this example is based on a previous supposed position 116' which is based on the optical positioning system 104. Thus, for determining the present position 122 in this example, the supposed position 116 and the previous position 120 are combined because the supposed position 116 is based on a different positioning system (namely the radio-based positioning system 108) than the previous supposed position 116' (which is based on the optical positioning system 104).

In the same example, for determining a next present position 122 due to performing the method 100 again, the supposed position 116 can again be based on the radio-based positioning system 108. Combining 118 can still be carried out although now a previous supposed position (namely the supposed position of the method 100 carried out before) is also based on the radio-based positioning system 108. However, the previous supposed position which counts in this example remains the previous supposed position 116' which is based on the optical positioning system 104. This can be the case until combining 118 is not necessary anymore (e.g. if the previous position 120 and the supposed position 116 are equal or adapted or a later described offset is completely reduced to zero) or until the basis of a supposed position 116 changes again with respect to a previous position. In this example, this would mean that the supposed position 116 is again based on the optical positioning system 104, like the previous position 116'. The method can also be used for other positioning systems using two different technologies for determining a same position.

Figure 2:
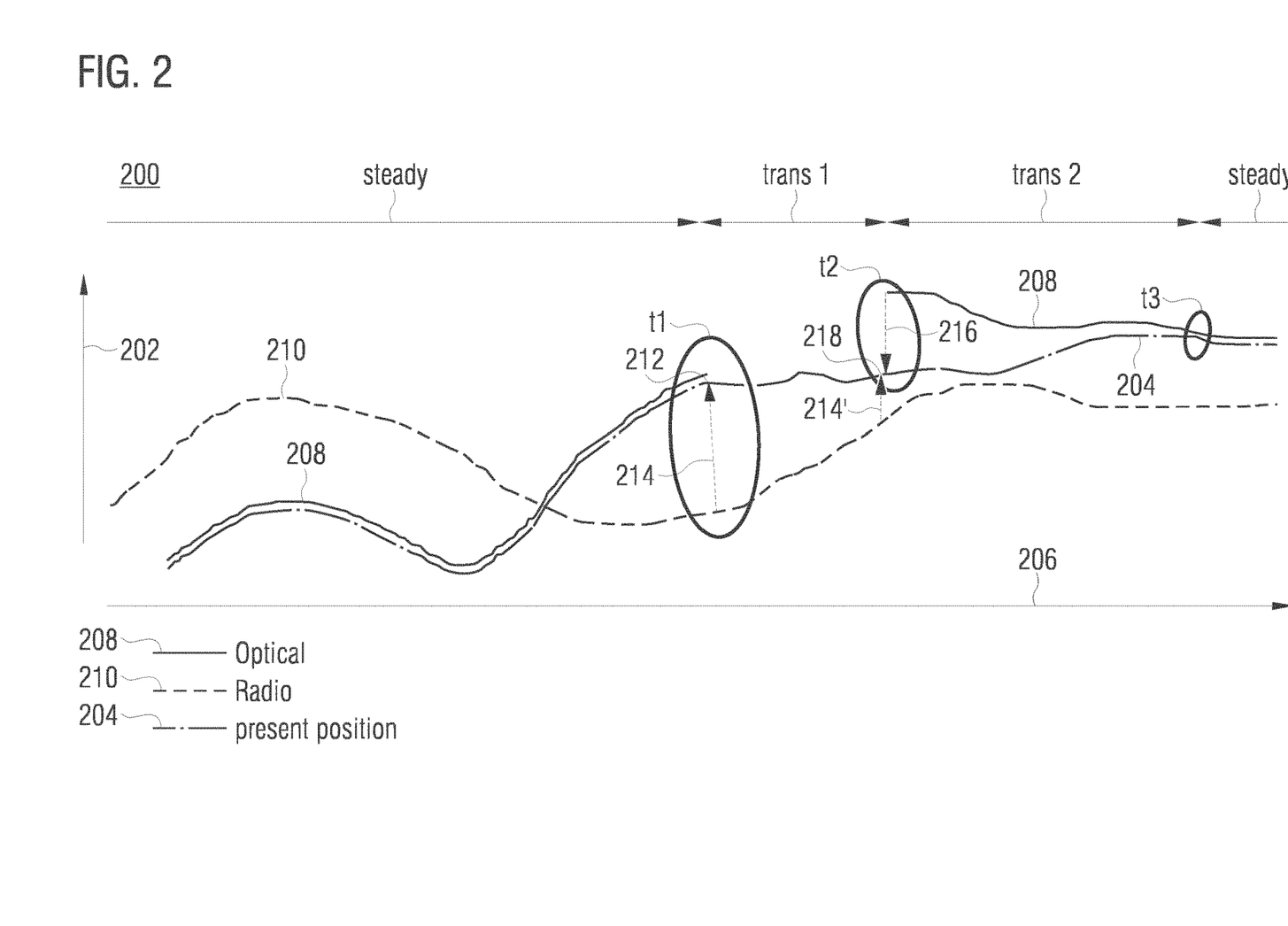
FIG. 2 shows an example of a method wherein temporary a supposed position is based on a radio-based positioning system.

FIG. 2 shows an example 200 of method 100 wherein a position 202 is shown and a present position 204 changes during a time 206. Example 200 shows an example for using the method for tracking the respective present position 204 of an object which moves during a respective time 206. In a first time span steady (steady state) the present position is equal to a respective first preliminary position 208 which is determined by the optical positioning system 104. A second preliminary position 210 is determined as well based on the radio-based positioning system 108. During time span steady the second preliminary position is not used and the combining 118 step does not take place, because no different positioning system is used for determining a previous supposed position (all supposed positions of time span steady are based on the optical positioning system 104 and its respective first preliminary position 208).

At a point t1 the optical system 104 shows a failure, e.g. an object moves between a camera of the optical system and an optical marker of the object such that a visual contact is interrupted and the first preliminary position can temporary not be determined. Thus, during the time span trans1 the supposed position is based on the radio-based positioning system 108. As shown in FIG. 1, the first determined supposed position of time span trans1 which is based on the second preliminary position 210 differs from a previous position 212, i.e. the last determined present position of time span steady. Because the supposed position of time span trans1 is based on a different positioning system than a previous supposed position (the last supposed position of time span steady) the present position 204 of time span trans1 is determined by combining the supposed position which is the second preliminary position 210 and the previous position 212. The combining according to this example includes determining a first offset 214 which describes a difference between the first supposed position of time span trans1 and the previous position 212. The offset 214 is added to the supposed position during time span trans1 to avoid a sudden jump from the optically determined position to the radio-based determined position at point t1. In the following steps of trans1, i.e. in the following performances of the method to determine the present position 204 or to provide a tracking of the object respectively, the offset 214 is being reduced with every determination step. During trans1 the second preliminary position 210 changes into the direction of the previous position 212. The present position 204 is determined by the second preliminary position and the offset 214 which is reduced with every determination of a present position 204. Thus, the present position 204 does not change as fast as the second preliminary position 210 so that the difference between the present position and the second preliminary position 210 gets smaller during trans1. At the last performance of the method of trans1 the remaining offset 214' may be e.g. 20% of offset 214, in other examples it may also be reduced to zero.

Reducing the offset 214 according to the example shown in FIG. 2 stops at point t2 because at t2 the optical system 104 is available again (e.g. the object between the camera and the optical marker does not interrupt the visual contact anymore) and the supposed position is now again the first preliminary position 208. During a time span trans2 a second offset 216 is being reduced to align or adapt the position determined by the radio-based system back to the optical system. The offset 216 is the difference of a new previous position 218 which is the last present position 204 of trans1 and the supposed position which is the first determined supposed position of trans2, i.e. the first preliminary position 208 at t2. During trans2 the difference between the two positioning systems is compensated, in other words the present position 204 is adapted from the radio-based system back to the optical system. In trans2, which lasts e.g. 1 second, the offset can be reduced during e.g. 25 steps of determining a respective present position 204. The reduction of offset 216 can be 4% of the initial offset 216 at t2 so that at point t3 the offset is reduced to zero. In other words, at t3 the determined present position is adapted back to the optical positioning system 104. Because the offset is reduced to zero, a combining of the supposed position with a previous position is not necessary anymore and the positioning system can run in a steady state (time span steady) again.

FIG. 2 thus shows a typical course of a tracker, or user, over time. At time 1 the optical position or positioning system fails and at time 2 it is available again. As the system utilizes the optical position, if available, the user position initially is equal to the position of the optical system. At time 1 the optical system fails and a switch over to the radio system is executed wherein the user further remains in his initial position. The required offset is stored by the system and slowly reduced algorithmically over time so that the user does not realize. The positions of the radio system are approached. From time 2, an optical position is available again and the offset is set accordingly and adapted again to the optical position in a further phase of approach. This method may also be applied vice versa to conceal the failure of the radio system.

For every axis x,y,z the adaptation of the position P to P' and/or the distance d=P'−P is taken over similar to the angular adaptation. FIG. 2 shows the user in position P in space while his virtual P' has a distance d. A one-time and immediate correction would strongly affect an "experience" of the user as the perceived movement does not correspond to the illustrated movement (jump) any more. This kind of motion (correction or sudden position jump) is perceived as unnatural by human beings and in its worst case may lead to sickness (so-called motion sickness). The presented method gradually adapts the position of the user in the real world to the position in the virtual world without the user noticing.

An equation for position calculation (without correction factor) could be given as:

$$P'_n = P_n + O*(d_{n-1} - |_n - P_{n-1}|*\alpha)$$

wherein O is the direction vector of the distance, d is the length of the distance and a the proportion of the position change.

Some examples are given in a pseudo code (without correction factor): An example shows distance correction $\Delta d=(x,y,z)$ only in case of a position change in the respective axis. In an example the distance d is d=(4,1,1), i.e. 4 units in the x direction, one unit each for y and z. The user makes a movement b=(1,0,0), i.e. only in the x direction. Then a distance correction is executed only in x direction. I.e., the distance correction $\Delta d$ is for x≠0, 0 for y and z. An example shows distance correction only along the axis of position change.

An example shows distance correction only in the direction of position change, not in the opposite direction (and/or less in the opposite direction). In an example the distance correction $\Delta d$ is a fraction of the measured movement b and is at most the distance in the (respective) axis $\Delta d$ (d>$\Delta d$ and $\Delta d$<b). The executed distance correction $\Delta d$ is subtracted from d, in order to only execute the correction only until the distance d has been settled.

In an example correction is executed adaptively. An example shows that the distance correction $\Delta d$ is executed with a proportion of 0-20% of the user movement b. An example shows the distance correction $\Delta d$ is approx. 5% of the user movement b. An example shows the distance correction $\Delta d$ is approx. 5% of the user movement b multiplied by a situation-dependent correction factors (e.g. ratio error to $\Delta d$). An example shows the distance correction $\Delta d$ may be executed via different functions (easing functions). An example shows Resetting the distance (between radio/optical) when putting on the glasses (this may be unambiguously detected using a sensor at the glasses).

Figure 3A:
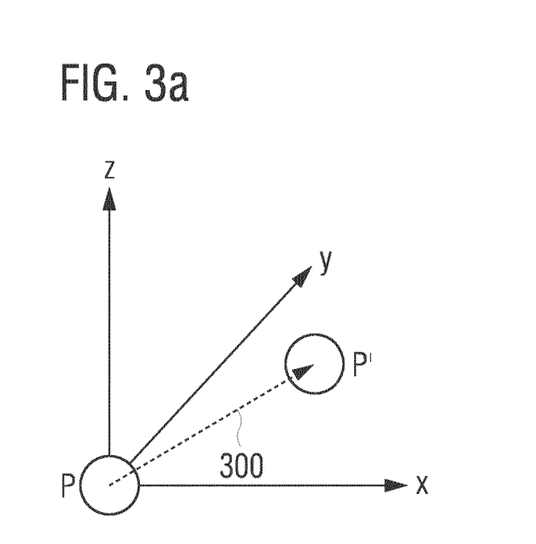
FIG. 3 shows examples of a position offset and an orientation offset.

FIG. 3a shows an example of a position offset 300 being a distance between a supposed position P and a previous position P'. A position comprises x-component x, y-component y and z-component z. The offset 300 comprises e.g. an x-component and a z-component. If the supposed position P changes in x-direction, the x-component of the offset 300 can be reduced. If the supposed position P changes in y-direction it is possible that the offset 300 remains the same, i.e. the offset 300 is not being reduced. The offset can be reduced by a fraction of a detected movement of the tracked object. A reduction step or correction can generally comprise three directions, e.g. a fraction $\Delta d=(x,y,z)$. If the position changes e.g. in x-direction, e.g. with b=(1,0,0), the fraction can be $\Delta d$ (offset 300>$\Delta d$ and $\Delta d$≤$\Delta b$) and effects only the x-component of the present position. This means the fraction is smaller than the position change and the correction stops, if offset 300 is compensated. The fraction may be 0-20% of a position change and/or 5% of the position change, optionally corrected by a situational correction factor. Though, as already mentioned the fraction may be another value according to an acceptance of a user and thus be set individually. Compensating the offset 300 may also be achieved by using a predefined function, e.g. an easing-function.

Figure 3B:
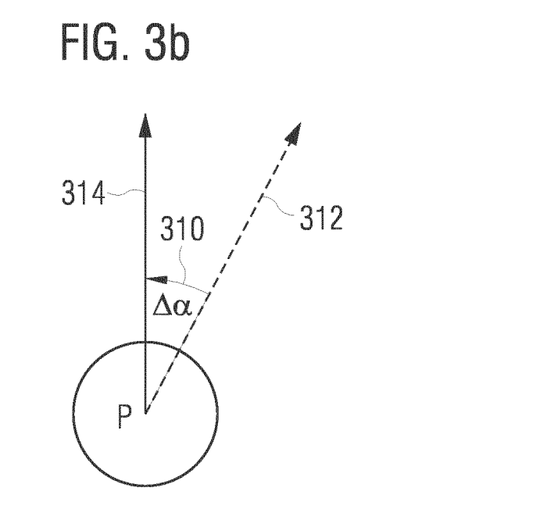

FIG. 3b shows an example of an orientation offset 310. An object at position P may have a supposed orientation angle 312 which is a yaw-angle of the object. This supposed orientation angle can be determined e.g. by an initial sensor system comprising a gyroscope or a combination of an accelerometer, a gyro and a magnetometer can be used to obtain the absolute orientation in a world space, e.g. in an area of the positioning system. In some situations a reference orientation 314 can be determined, e.g. by an external optical system. If the reference orientation is available it can be used as supposed orientation thus the supposed orientation is based on a different orientation system (namely the optical system) than a previous supposed orientation (which is based on the gyroscope orientation). It is possible to reduce the orientation offset 310 in order to align or adapt the determined orientation to the reference orientation 314 which can be called previous orientation 314 in analogy to a previous position 120. The offset 310 can be reduced in a similar way like an offset 214, 216. This means that for example also a fraction of the orientation offset may be 0-20% of an orientation change or that the fraction can be corrected by a correction factor depending on a respective situation.

In some examples, in between two reference measurements of an (external) reference system the orientation system may already have drifted off due to different effects, so that an angular error $\Delta\alpha$ exists. This erroneous orientation is adapted so that a person does not perceive this correction. Here, if necessary, for a certain time period a deviation of the orientation from the actual orientation may be accepted in order to prevent a perceivable and/or visible reset of the angular error. In an example, an exception can occur, wherein the first reference measurement should be set directly without adaptation (e.g. when putting on the VR (virtual reality)/AR (augmented reality) headset).

In other examples, in certain intervals, e.g. with every measurement of the rotation rate (d) and/or with every rendered frame a gradual correction of the currently erroneous orientation a towards the reference angle αr is executed.

An example shows an angular error correction only in case of a change of the rotation angle. An example shows an angular error correction only in the direction of the change of the rotation angle, not in the opposite direction (and/or less in the opposite direction). An examples shows an angular correction $\Delta\alpha'$ is only executed if a rotation ($\omega$) around the vertical axis is measured, e.g. by a rotation rate sensor. An example shows the angular correction $\Delta\alpha'$ is a fraction of the measured rotation $\omega$ and is at most the angular error $\Delta\alpha$ (d>$\Delta\alpha'$ and $\Delta\alpha'$<=$\Delta\alpha$). The executed angular correction $\Delta\alpha'$ is subtracted from $\Delta\alpha$, to execute the correction only until the angular error $\Delta\alpha$ is settled. An example shows an angular correction $\Delta\alpha'$ is executed with a proportion of 0-20% of the rotation rate $\omega$. An example shows an angular correction $\Delta\alpha'$ is approx. 1% of the rotation rate $\omega$. An examples shows an angular correction $\Delta\alpha'$ may be executed via different functions (easing functions).

Figure 4:
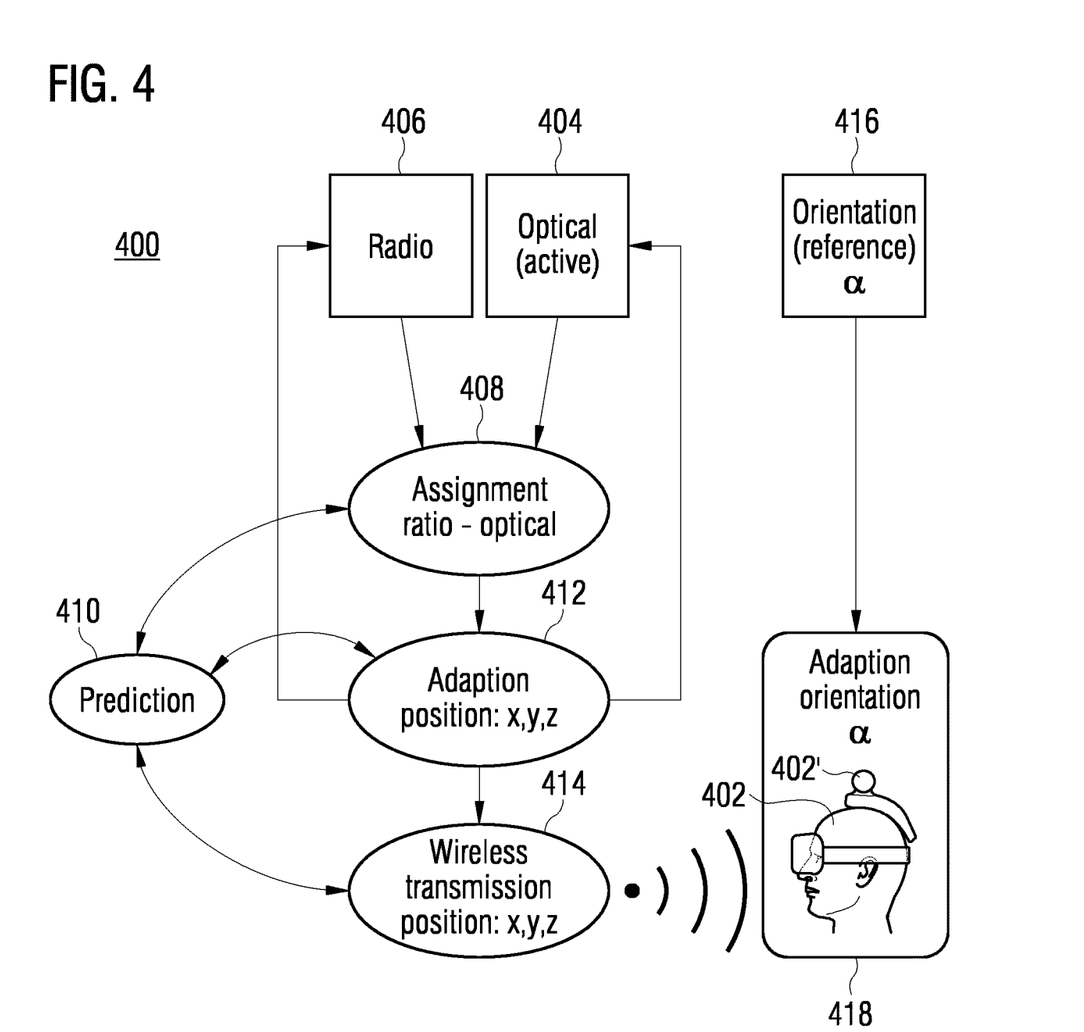
FIG. 4 shows a schematic flow diagram of a method.

FIG. 4 shows a schematic flow diagram 400 of a method 100 to determine a position and an orientation of an object 402 or a tracker 402' at the object, respectively. The method comprises using an active optical positioning system 404 with an active optical marker as part of tracker 402' and using a radio system 406 to determine the position of the tracker 402'. Due to an assignment 408 either the radio-based or the optical system are used for a prediction 410. According to the prediction 410 an adaptation 412 of the determined position takes place. In a wireless transmission 414 an information of the determined position can be sent e.g. to spread the tracking position of the object 402 to respective applications or other devices, e.g. to other devices of a virtual reality system. Additionally to the position determination a determination of an orientation 416 is performed and in some examples an adaptation 418 of the orientation is carried out, e.g. if the determined orientation is based on an optical system whereas a previous orientation is based on an initial sensor system. Other optical signals, e.g. reflections that do not have their origin in the active optical marker can be neglected according to the method 100.

Figure 5:
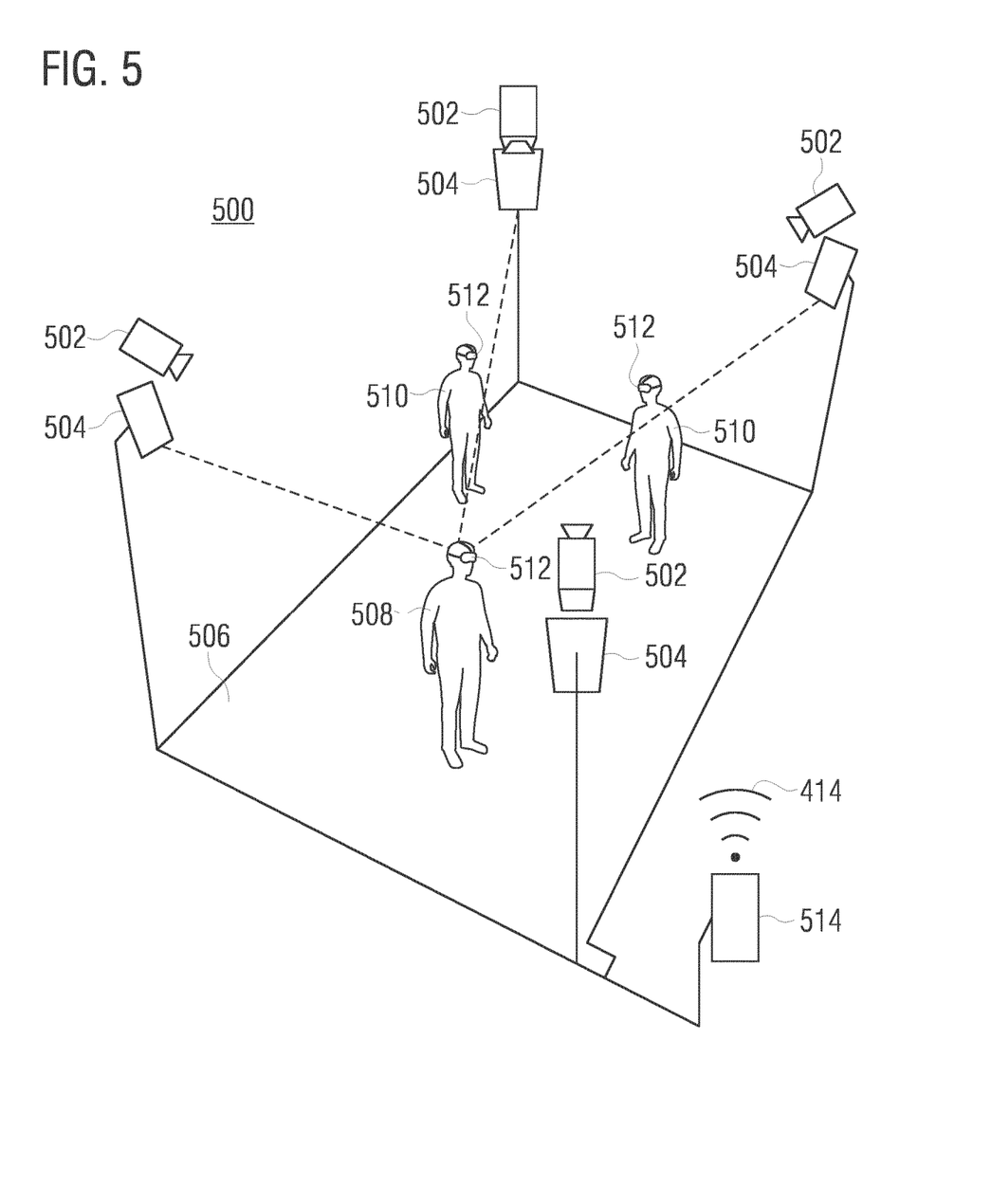
FIG. 5 shows a schematic positioning system.

FIG. 5 shows a schematic positioning system 500. It comprises cameras 502 as tracking devices for optical position determination and antennas 504, e.g. RF-antennas, for radio-based position determination. The cameras 502 and antennas 504 are positioned at corners of an area 506 which is an area in that a determination of objects is provided. Cameras can also look from the center to the corners in other examples; so inverse positions of the cameras are possible as well. For example the cameras 502 and antennas 504 are positioned at a ceiling or on respective racks or stands to achieve an elevated position. The positioning system 500 can determine a position of a first user 508 and other users 510. E.g. the positioning system is for providing a tracking in a virtual reality and the users 508, 510 carry virtual reality devices 512. The virtual reality devices can comprise a display for showing virtual reality context to the users 508, 510. It further comprises an optical marker, especially an active optical marker configured to emit a light signal detectable by a camera 502, and a radio tracker, e.g. a transmitter or transceiver configured to send a radio signal to an antenna 504. The markers can be provided e.g. by the tracker 600 of FIG. 6. A position server 514 collects the respective determined positions and provides sensor fusion of the optical and radio-based system as well as orientation of the users 508, 510 or virtual reality devices 512, respectively. Position server 514 can also perform the method 100 and thus an adaptation, e.g. changing from using of the optical system with cameras 502 to using the radio-based system with antennas 504. It is possible that on the area 506 only four cameras 502 are needed because the virtual reality device 512 comprises an active optical marker which increases a coverage distance of the optical system.

In an example the optical marker can emit a modulated, pulsing signal to identify and synchronize the respective target. If no optical positon is visible it is possible to use a radiofrequency signal to ask or activate the optical beacon of a particular tracker or head mounted device to blink in a detectable manner. Thus, a detectability of an optical tracker could be improved.

In one example for determining the present position 204 of user 508, the optical system 104 is used, i.e. the supposed position is based on the first preliminary position 208. At t1 user 510 covers user 508 such that cameras 502 cannot provide the first preliminary position 208 due to an interruption of the visual contact to the virtual reality device 512. Thus, second preliminary position 210 is used as the basis of the supposed position and due to combining 118 the offset 214 is added such that changing to the radio-based system does not lead to jerks in a scene shown to user 508 by the virtual reality device 512. During trans1, e.g. during the next 2 seconds after changing to the radio-based system, the offset can be reduced e.g. by the position server 514, e.g. if user 508 moves such that she does not notice a reduction of the offset 214. After trans1 the determined present position of user 508 can be adapted to the radio-based system wherein the adaptation was carried out gradually. The position of user 508 can be provided by wireless transmission 414 e.g. to the other users 510 or their virtual reality devices 512 respectively.

In some examples it is possible that the combined optical and radio-based positioning system uses both first and second preliminary position to determine two respective supposed positions that are combined to a present position. An effect may be a reduced latency in determining the position due to a possible predictive determination as well as verifying or checking a basic functionality of the positioning system. If for example both optically and radio-based determined positions differ within a predefined tolerance range it is high probable that the systems operates without errors. Also fluctuations of radio signal data may be compensated. By comparing the respective other positioning system it is possible that calibration data can be optimized.

Figure 6A:
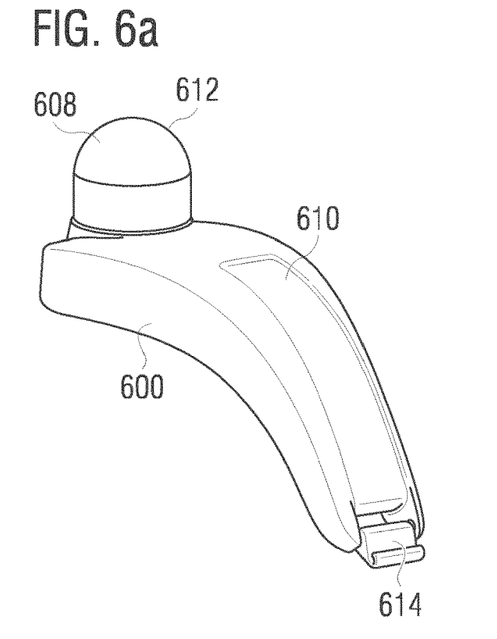
FIG. 6 shows a schematic tracker and a wearable tracker.
Figure 6B:
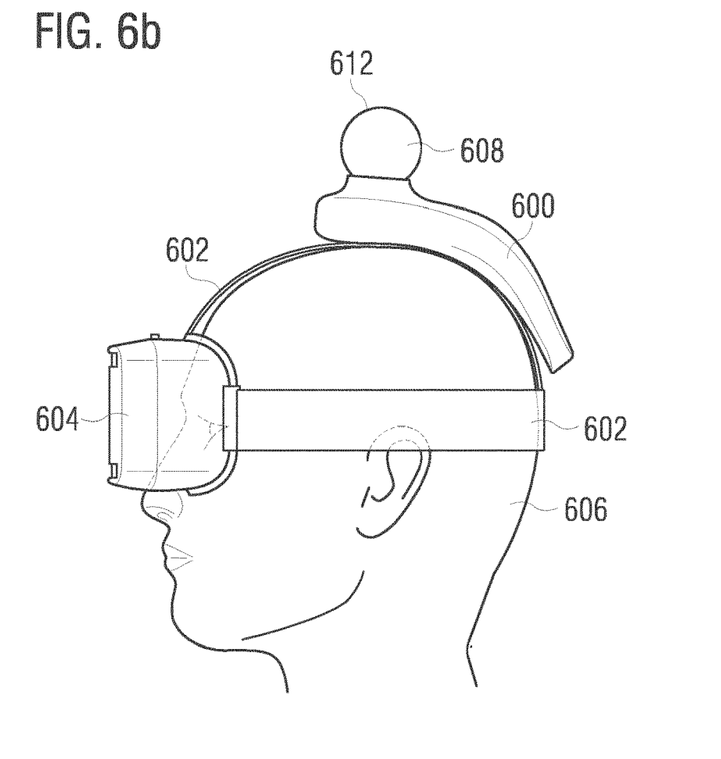

FIG. 6a shows a schematic tracker 600 and FIG. 6b the tracker 600 integrated in a wearable 602. The wearable 602 is a headband which further includes a visualization device 604 that is configured to show virtual content to a user 606 wearing the wearable 602. It is possible that the users 508, 510 wear the wearable 602 comprising the tracker 600 and the visualization device 604 as virtual reality devices 512.

The tracker 600 comprises an optical marker 608 and a radio transceiver 610. The optical marker can be e.g. an active infrared light or comprise a plurality of active infrared lights or plurality of passive markers. A transparent housing 612 can cover the infrared lights, e.g. infrared LEDs. The optical marker 608 is positioned above a head of the user 606 if the wearable is worn. Due to this exposed position a probability that an infrared light beam can be sensed by a camera can be increased such that a reliability of the optical system can be increased. The transparent housing can be configured such that an infrared light can be emitted in all directions, i.e. 360° around the optical marker 608. In this way, a present position of the marker can be determined optically independent from an orientation of user 606 or the optical marker 608, respectively. The tracker 600 comprises a hook 614 or clip 614, e.g. that the tracker 600 can be clipped on a headband or a helmet. The tracker can be attached in different directions depending on the given headset. One possible configuration is shown with an attachment of the hook side to the back of the headset.

In some examples, the tracker can be positioned on the head in other ways. E.g., the tracker can be attached to a headset, in the front or on a back side.

The shown approach describes a method which enables tracking via different systems in virtual/augmented reality (VR/AR). There are two tracking methods for VR/AR which each may have specific characteristics.

Optical methods may be highly accurate, provides 6DOF (6 degree of freedom (x,y,z,yaw,roll,pitch)), 3DOF (x,y,z), small range between camera and (passive) marker, visual connection can be required, with 6DOF small distance to camera and/or big target can be required, identification via target can be required.

Radio-based methods can be reliable, can work even without visual connection, have high range, be less accurate, can comprise that per transmitter usually 3DOF, x,y,z is provided with high accuracy.

The distance of the markers in the target and the distance of the target to the camera play a substantial role. If the distance of the target to the camera gets too big, neither the markers in the target may be clearly resolved (and consequently the target may not be detected) nor may the reflections of the markers be detected. The range of the distance for passive marker systems currently is a few meters. If the target is not detected any more, identification is not possible and a clear allocation of objects and/or users is lost. For large areas the only possibility is to clearly increase the number of cameras (linear to the area). Several hundred cameras may here soon be required. Thus, in case of optical IR systems costs are strongly coupled to the size of the area.

Examples of the shown method describe the combination of radio and optical systems which combines the advantages of both methods for VR/AR applications. Here, active optical markers are utilized.

Examples relate to active infrared marker, individual marker per person instead of target, big area: more than 5×5 m, ceiling camera, in applicable design of the marker, if applicable several markers per user and/or Props (objects), blinking vs continuous transmission (currently continuous use).

Other examples show a combined transmitter and/or marker (optical, radio); a combined transmitter with active optical emission via a marker; a combined transmitter with active optical emission via several markers and/or as a target; a position server which combines both systems and each provides the fused position for each object/user; discarding all optical positions (e.g. reflections) without any corresponding radio marker nearby.

Other examples show that the system may compensate the failure of a position (optically due to masking, radio due to shielding) by using the respectively associated other position; in order to reduce latencies the system may use any combination of the tracking information of both tracking systems (optical and radio) to execute a predictive positioning; the data of both position providing systems (optical and radio) may be used to check the input data of the respective individual systems and adaptively optimize the same. Primarily this means a reduction of fluctuation of the radio data; the system as a whole may compensate the failure of a tracking system as (short-time) data recording enables an imperceptible transition; utilization may in principle also be applied to alternative tracking systems providing positions and/or orientation and any temporal derivatives;

Other examples show that the imperceptible transition corresponds to a gradual adaptation of the input data; a non-identifiable marker (here optical marker) may also be identified by adding an identifiable marker (here radio); the two tracking systems may mutually optimize their calibration data by mutual comparing; INS (acceleration, gyroscope, magnetic field, barometer) based POSE assessment for motion classification (e.g. putting on glasses, person standing, walking, static)—in parallel to that motion classification with the help of optical trajectory:

improvement of the identification (allocation radio system/INS to optical) when putting on and/or allocation between radio system/INS and optical system in ongoing operation detection/removal of static reflections of the optical system Some examples use splines (different input streams) for optimizing the virtual user trajectory. In this respect, initial learning using the combination of the different input streams in a regressor/classifier takes place:

radio trajectory

INS trajectory optical trajectory (perfect reference when learning e.g. on small area)

Then, in the ongoing operation (big area) the data is also passed through the regressor/classifier which then, with the help of the learnt facts, supplements the then incomplete/partial data into an optimal trajectory (user specific movement model).

With commercial infrared systems (IR) conventionally for an identification and measurement of the 6DOF pose (x,y,z,yaw,roll,pitch) a so-called target is used. Targets are a unique combination of reflecting/active markers.

A pose can consists of those elements:

position, consisting of x,y,z orientation a (and/or yaw and/or rotation around the vertical axis)

The further angles (roll, pitch) may not necessarily be required, as the same may be determined unambiguously by sensors at the head of the user. For adapting the Pose, orientation and position errors and/or distances are adapted.

Regarding the systems, for the radio system a high failure safety is used to utilize radio positions in case of a failure of the optical position. A typical course of position of the different systems and the resulting virtual position of the user over time is shown in FIG. 2.

Generally, adaptation is planned to be gradual. Exception may be: The first reference measurement out to be set directly without an adaptation (e.g. when putting on the VR/AR headset). An abrupt adaptation may be sensible in some situations and be supported from the content side, e.g. by:

Simulated earthquake: the viewport and/or the virtual camera is shaken as in case of an earthquake and adaptation may be executed during that phase (both orientation and also position).

Masking the viewport by effects: particle effects, fog, hiding the camera by virtual objects.

Fading out the virtual world: darkness (black), closing of a virtual door

Transformation of the virtual world (shifting, stretching, compressing, distorting, . . . ), twisting paths.

Thus, an optical and a radio system is combined so that two substantial advantages result:
- By using a combined transmitter (optical/radio) also without an identification of the target a distinct ID (via radio) with respect to a non-distinct optical marker is given.
- A high accuracy is acquired by using optical transmitters and at the same time using as low a number of cameras as possible.

To avoid unwanted effects or position jumps when changing the systems, an adaptation of a position and/or an orientation is provided. The method can be provided for other combined positioning systems rather than optical and radio-based as well. Examples might relate to a positioning system comprising a piezoresistive and/or capacitive and/or magnetic position determination of a position of an user (e.g. a finger position) on a plate or display. Other examples might relate to finger printing on a magnetic field.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless exillicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method to determine a present position of an object, comprising:
using an optical positioning system to determine an optical position, being a position of an optical marker at the object;
using a radio-based positioning system to determine a radio position, being a position of a transmitter at the object;
determining a supposed position on the basis of one of the optical or the radio positions;
determining whether the supposed position is based on a different positioning system than a previous position of the object, wherein the previous position is based on a previous supposed position;

initially setting an offset when the supposed position is first based on the different positioning system than the previous supposed position;
combining the supposed position and the offset with the previous position of the object to determine the present position of the object; and
reducing the offset between the previous position and the supposed position.

2. The method of claim 1, further comprising:
using an available optical position or an available radio position as the supposed position if either the optical or the radio position is not available.

3. The method of claim 1, further comprising:
using the optical position as the supposed position if both the optical and the radio positions are available.

4. The method of claim 1, wherein
reducing an offset takes place if the supposed position is changed with respect to a previous supposed position and the supposed position is based on a same positioning system as the previous supposed position.

5. The method of claim 4, wherein
reducing an offset takes place only if the supposed position is changed towards the previous position.

6. The method of one of claim 1, wherein reducing the offset further comprises:
reducing the offset by a predetermined fraction of the initial offset until the offset is compensated and/or the supposed position is based on a different positioning system than a previous supposed position.

7. The method of one of claim 1, wherein reducing the offset comprises:
reducing the offset by up to 20% of a position change between the supposed position and the previous supposed position.

8. The method of claim 1, further comprising:
determining an orientation of the object, by using an optical positioning system.

9. The method of claim 8, further comprising:
reducing an initial offset between the orientation and a reference orientation, if the reference orientation is determined using a reference system.

10. The method of claim 1, further comprising:
reducing a residual offset completely in one single step if a predefined condition is fulfilled.

11. The method of claim 1, further comprising:
using an active light source at the object as an optical marker.

12. The method of claim 11, wherein the active light source comprises at least one infrared light.

13. The method of claim 12, wherein the active light source is modulated and emitting blinking or pulsing light with a predefined modulation pattern.

14. A positioning system with combined optical and a radio-based determination of a position of a tracker, comprising:
a tracker, comprising at least one optical and at least one radio-based marker for optical and radio-based position determination respectively;
a tracking device, comprising a camera and an antenna configured to receive an optically determined and a radio-based determined position of the tracker as possible supposed positions of the tracker, wherein
the tracking device is configured to,
determine whether a supposed position of the possible supposed positions is based on a different positioning system than a previous position of the object, wherein the previous position is based on a previous supposed position of the possible supposed positions,
initially set an offset when the supposed position is first based on the different positioning system than the previous supposed position,
combine the supposed position and the offset with a previous position of the tracker to determine a present position of the tracker, and
reduce the offset between the previous position and the supposed position.

15. The tracker for the combined optical and radio-based positioning system of claim 14, the tracker comprising:
an optical marker, comprising an active light source; and
a radio transmitter, configured to send an information signal comprising a position of the tracker.

16. The tracker of claim 15, wherein the active light source comprises an infrared light which emits a constant light signal or a pulsed light signal.

17. The tracker of claim 15, wherein the tracker is configured to be wearable on a head of a user or attachable to a helmet and/or the tracker is a virtual-reality-wearable and/or augmented-reality-wearable.

18. A non-transitory, computer-readable medium comprising program code, when executed, to cause a programmable processor to perform the method of claim 1.

* * * * *